(12) United States Patent
Kraemer (10) Patent No.: US 11,772,609 B2
(45) Date of Patent: Oct. 3, 2023

(54) WIPER DEVICE

(71) Applicant: Robert Bosch GmbH, Stuttgart (DE)

(72) Inventor: Godelieve Kraemer, Huegelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/975,016

(22) PCT Filed: Jan. 12, 2019

(86) PCT No.: PCT/EP2019/050725
§ 371 (c)(1),
(2) Date: Aug. 21, 2020

(87) PCT Pub. No.: WO2019/161990
PCT Pub. Date: Aug. 29, 2019

(65) Prior Publication Data
US 2021/0070256 A1    Mar. 11, 2021

(30) Foreign Application Priority Data
Feb. 22, 2018   (DE) ..................... 10 2018 202 714.5

(51) Int. Cl.
*B60S 1/38*     (2006.01)
*B60S 1/34*     (2006.01)
(Continued)

(52) U.S. Cl.
CPC ............. *B60S 1/3862* (2013.01); *B60S 1/344* (2013.01); *B60S 1/4083* (2013.01); *B60S 1/522* (2013.01)

(58) Field of Classification Search
CPC ...... B60S 1/3862; B60S 1/4048; B60S 1/524; B60S 2001/4054; B60S 1/38; B60S 1/40;
(Continued)

(56) References Cited

U.S. PATENT DOCUMENTS

2012/0167326 A1   7/2012   Egner-Walter et al.
2014/0196240 A1*  7/2014   Grasso .................... B60S 1/524
                                                          15/250.04
(Continued)

FOREIGN PATENT DOCUMENTS

DE     102013209196 A1    11/2014
DE     102014017602       6/2015
(Continued)

OTHER PUBLICATIONS

International Search Report for Application No. PCT/EP2019/050725 dated Mar. 21, 2019 (English Translation, 2 pages).

*Primary Examiner* — Katina N. Henson
(74) *Attorney, Agent, or Firm* — Michael Best & Friedrich LLP (57) ABSTRACT

The invention relates to a wiper device, in particular a windscreen wiper device, having a wiper arm adapter (10) and having a wiper blade adapter (12), the wiper arm adapter (10) being provided for coupling to the wiper blade adapter (12) in the main extension direction of the wiper blade adapter (12), and further having a wiper arm channel element (14) of a spray unit (34). According to the invention, the wiper arm channel element (14) is provided for coupling to a wiper blade channel element (16) of the wiper blade adapter (12) in a main extension direction of the wiper blade adapter (12).

18 Claims, 4 Drawing Sheets

(51) Int. Cl.
*B60S 1/40* (2006.01)
*B60S 1/52* (2006.01)

(58) Field of Classification Search
CPC .......... B60S 1/52; B60S 1/344; B60S 1/4083;
B60S 1/522; B60S 1/3805; B60S 1/4038;
B60S 1/4045; B60S 1/3851; B60S 1/3849
USPC .................................. 15/250.04; 239/284.1
See application file for complete search history.

(56) References Cited

U.S. PATENT DOCUMENTS

2017/0066411 A1   3/2017   Schaeuble et al.
2018/0370495 A1   12/2018  Depondt

FOREIGN PATENT DOCUMENTS

| DE | 102015224609 A1 | * | 6/2017 |
| DE | 102015226527 | | 6/2017 |
| EP | 2815932 | | 12/2014 |
| FR | 3004685 | | 10/2014 |
| FR | 3015398 A1 | | 6/2015 |

* cited by examiner

WIPER DEVICE

BACKGROUND OF THE INVENTION

A wiper device having a wiper arm adapter and having a wiper blade adapter has already been proposed, wherein the wiper arm adapter is provided for coupling to the wiper blade adapter in the main extension direction of the wiper blade adapter, and having a wiper blade arm element of a spray unit.

SUMMARY OF THE INVENTION

The invention is based on a wiper device, in particular a windscreen wiper device, having a wiper arm adapter and having a wiper blade adapter, wherein the wiper arm adapter is provided for coupling to the wiper blade adapter in the main extension direction of the wiper blade adapter, and further having a wiper arm channel element of a spray unit.

It is proposed that the wiper arm channel element is provided for coupling to a wiper blade channel element of the wiper blade adapter in a main extension direction of the wiper blade adapter.

By means of the embodiment of the wiper device according to the invention, a mounting and/or dismantling of a spray unit, preferably of a wiper blade adapter relative to a wiper arm adapter, and/or particularly preferably of a wiper arm relative to a wiper blade, may be simplified. Moreover, in particular, a sealed and re-releasable connection of the spray unit may be achieved. A uniform design may be achieved in a particularly advantageous manner, wherein in particular the spray unit is arranged so as to be at least partially concealed by the wiper arm and/or the wiper blade.

In particular, the wiper device may comprise the spray unit. A "spray unit" is intended to be understood, in particular, as a unit which comprises components of a wiper which are involved in the spraying of washing water, such as in particular a washing water channel, a spray nozzle element, a nozzle coupling, a nozzle opening and/or the like. A "wiper arm adapter" is intended to be understood in this context, in particular, as an adapter which has a contact region with a wiper arm component and is captively connected to the wiper arm component and is provided to supply a coupling region of the wiper arm component for coupling and/or contact with a wiper blade adapter. "Provided" is intended to be understood, in particular, as specifically programmed, designed and/or equipped. An object being provided for a specific function is intended to be understood, in particular, as the object fulfilling and/or performing this specific function in at least one use state and/or operating state. A "wiper blade adapter" is intended to be understood in this context, in particular, as an adapter which has a contact region with a wiper blade component and is captively connected to the wiper blade component and is provided to supply a coupling region of the wiper blade component for coupling and/or contact with a wiper arm adapter. In particular, the wiper blade adapter and the wiper arm adapter are able to be coupled together in the main extension direction of the wiper blade adapter. A "main extension direction" of an object is intended to be understood in this case, in particular, as a direction which runs parallel to a longest edge of a smallest geometric cuboid which only just completely encloses the object. In particular, "coupled" is preferably intended to be understood as releasably connected, and particularly preferably releasably connected without the use of tools, and namely in particular non-positively and/or positively connected, such as for example by being wedged-in, latched-in, cut-in or the like. "Non-positively and/or positively connected" is intended to be understood in this case, in particular, as a releasable connection, wherein a retaining force is preferably transmitted between two components by a geometric engagement of the components in one another and/or a frictional force between the components. A "channel element" is intended to be understood, in particular, as an element which is provided for at least partially guiding washing water and, viewed in the direction of flow, directly encloses the washing water at least partially, preferably on three sides and particularly advantageously entirely. Preferably a main extension of the channel element is parallel to the direction of flow of the washing water and at least 2-times, in particular at least 5-times, and advantageously at least 10-times longer than at least a cross-sectional extension of the channel element. A "wiper arm channel element" is intended to be understood, in particular, as a channel element which is arranged on the wiper arm side. A "wiper blade channel element" is intended to be understood, in particular, as a channel element which is arranged on the wiper blade side. In particular, the wiper blade adapter and/or the wiper arm adapter comprises at least a base body which in a mounted state of the wiper blade adapter and/or the wiper arm adapter covers at least the wiper arm channel element and/or the wiper blade channel element, at least partially, preferably at least to a large extent and particularly preferably entirely, in particular when viewed in a direction at least substantially perpendicular to a wiping surface. "At least substantially perpendicular" is intended to be understood, in particular, as an orientation of a direction relative to a reference direction, wherein the direction and the reference direction, in particular when viewed in one plane, enclose an angle of 90°, wherein the angle has, in particular, a maximum deviation of in particular less than 8°, advantageously less than 5° and particularly advantageously less than 2°. The expression "at least to a large extent" is intended to be understood in this case, in particular, as by at least 55%, preferably by at least 65%, preferably by at least 75%, particularly preferably by at least 85% and quite particularly preferably by at least 95%. In particular, in a coupled state the wiper arm channel element and the wiper blade channel element are connected together in a water-tight manner. In a coupled state, the wiper arm channel element and the wiper blade channel element form, in particular at least partially, preferably at least to a large extent, a washing water channel of the spray unit.

It is further proposed that the wiper blade channel element of the wiper blade adapter has a main extension which is oriented at least substantially parallel to the main extension direction of the wiper blade adapter. Advantageously, a mounting may be further simplified thereby. In particular, constructional space may be saved. A "main extension direction" of an object is intended to be understood in this case, in particular, as a longest extension of a smallest geometric cuboid which only just completely encloses the object. "At least substantially parallel" is intended to be understood, in particular, as an orientation of a direction relative to a reference direction, wherein the direction and the reference direction, in particular when viewed in one plane, enclose an angle of 0°, wherein the angle in particular has a maximum deviation of, in particular, less than 8°, advantageously less than 5° and particularly advantageously less than 2°. Moreover, in particular, the wiper arm channel element has a main extension which is oriented at least substantially parallel to the main extension direction of the wiper arm adapter. In particular, when the wiper arm adapter and the wiper blade adapter are oriented at least substantially parallel to one another, the wiper arm channel element and the wiper blade channel element are also arranged at least substantially parallel to one another.

It is further proposed that the wiper blade channel element of the wiper blade adapter is at least partially integrally formed on a base body of the wiper blade adapter. Advantageously a mounting may be further simplified thereby. Moreover, in particular, additional components may be avoided. "At least partially integrally" is intended to be understood in this context, in particular, as an object having at least one component which is connected integrally to at least one further component of the object. "Integrally" is intended to be understood, in particular, as connected at least by a material connection, for example by a welding process, a bonding process, an injection-molding process and/or a further process appearing expedient to the person skilled in the art. Advantageously, integrally is also intended to be understood as in one piece. "In one piece" is intended to be understood, in particular, as molded in one piece, such as for example by producing from a casting and/or by producing in a single-component or multi-component injection-molding method and advantageously from a single blank. In particular, the wiper arm channel element of the wiper arm adapter may be at least partially integrally formed on a base body of the wiper arm adapter. Alternatively, the wiper arm channel element could also be separately configured from the wiper arm adapter. In particular, the wiper arm channel element is able to be separately coupled to a wiper arm and/or a wiper arm adapter.

It is further proposed that the wiper blade channel element of the wiper blade adapter is at least partially configured as a cylindrical cutout and is provided to guide the wiper arm channel element for coupling in the main extension direction of the wiper blade adapter. Advantageously a mounting may be further simplified thereby. In particular, a mounting with an accurate fit may be achieved. In particular, the cutout has a tapering, preferably along the main extension of the wiper blade channel element. The tapering in this case may be configured, in particular, continuously and/or in a stepwise manner.

It is further proposed that the wiper blade adapter has at least one spray nozzle element which is configured at least partially integrally with the wiper blade channel element of the wiper blade adapter. As a result, a flexible provision of washing water may be achieved. In particular, the wiper blade adapter element may comprise at least two and particularly preferably a plurality of spray nozzle elements. Preferably, the spray nozzle element is at least partially covered by the base body of the wiper blade adapter, preferably at least to a large extent and particularly preferably entirely, in particular when viewed in a direction perpendicular to a wiping surface. Moreover, the wiper blade adapter may have further spray nozzle elements. Preferably, the spray nozzle element has at least two nozzle openings which are preferably oriented in two different directions.

It is further proposed that the wiper arm channel element has a sealing projection which is provided to be at least partially wedged into a wall of the wiper blade channel element. Advantageously a sealing action may be improved thereby. Moreover, a coupling may be particularly secured. In particular, the sealing projection at least partially cuts into the wall. In particular, in a mounted state of the wiper blade channel with the wiper arm channel the sealing projection cuts into the wall in the region of the cutout of the wiper blade adapter. Particularly preferably, the sealing projection has at least partially a conical shape. Advantageously a mounting may be further simplified thereby, since such a conical sealing projection may be easily inserted into the cutout of the wiper blade adapter. Moreover, the conical shape advantageously prevents the sealing projection from being pulled out of the cutout. Additionally, in particular, a particularly advantageous water-tight sealing action may be achieved.

It is further proposed that the wiper arm channel element has at least one spray nozzle element which in a mounted state is arranged outside the wiper blade channel element. Advantageously the flexibility of the provision of washing water may be further improved thereby. In particular, the spray nozzle element is arranged outside a smallest imaginary cuboid which only just completely encloses the wiper blade channel element. Preferably, the spray nozzle element is at least partially covered by the base body of the wiper blade adapter, preferably at least to a large extent and particularly preferably entirely, in particular when viewed in a direction perpendicular to a wiping surface.

It is further proposed that the wiper blade adapter has at least one guide element which, when coupled to the wiper arm adapter, is provided at least partially to guide the wiper arm adapter. Advantageously a mounting may be simplified thereby. Preferably, the wiper blade channel element forms the guide element. Moreover, the wiper arm adapter has at least one corresponding guide element which is configured so as to correspond to the guide element of the wiper blade adapter. Preferably, the corresponding guide element is configured by the wiper arm channel element.

In a further feature of the invention a method for mounting a wiper device, in particular the aforementioned wiper device, is proposed, in which a wiper arm adapter is coupled to a wiper blade adapter in the main extension direction of the wiper blade adapter, wherein in at least one method step a wiper arm channel element of a spray unit in the main extension direction of the wiper blade adapter is coupled to a wiper blade channel element of the wiper blade adapter. By means of the embodiment of the method according to the invention, a mounting and/or dismantling of a spray unit, preferably of a wiper blade adapter relative to a wiper arm adapter and/or particularly preferably a wiper arm relative to a wiper blade, may be simplified. Moreover, in particular, a sealed and re-releasable connection of the spray unit may be achieved. Particularly advantageously, a uniform design may be achieved, wherein in particular the spray unit is at least partially arranged so as to be concealed by the wiper arm and/or the wiper blade. In particular, when mounted, the wiper blade adapter and the wiper arm adapter are arranged in parallel and preferably coinciding in the main extension directions thereof. Particularly preferably, the respective main extension directions of the wiper blade adapter and the wiper arm adapter coincide with a mounting direction. Preferably, the wiper blade adapter and the wiper arm adapter are clipped into one another by being moved toward one another, in particular in the mounting direction.

It is further proposed that in the method step the wiper arm channel element is automatically coupled to the wiper blade channel element when the wiper arm adapter is coupled to the wiper blade adapter. A mounting may be further improved thereby. A coupling taking place automatically with a further coupling is intended to be understood in this case, in particular, as this coupling preferably taking place by a single movement in the same direction, in particular in the respective main extension direction and preferably in the mounting direction.

The wiper device according to the invention and the method according to the invention are not intended to be limited in this case to the above-described use and embodiment. In particular, the wiper device according to the invention and the method according to the invention for fulfilling a mode of operation described herein may have a number of individual method steps, elements, components and units which differs from a number cited herein. Additionally, in the value ranges specified in this disclosure, values which lie within the cited limits are also to be regarded as disclosed and usable as desired.

BRIEF DESCRIPTION OF THE DRAWINGS

Further advantages are disclosed from the following description of the drawings. An exemplary embodiment of the invention is shown in the drawings. The drawings, the description and the claims contain numerous features in combination. The person skilled in the art will also expediently consider the features individually and combine them together to form further meaningful combinations.

In the drawings.

DETAILED DESCRIPTION

Figure 1:
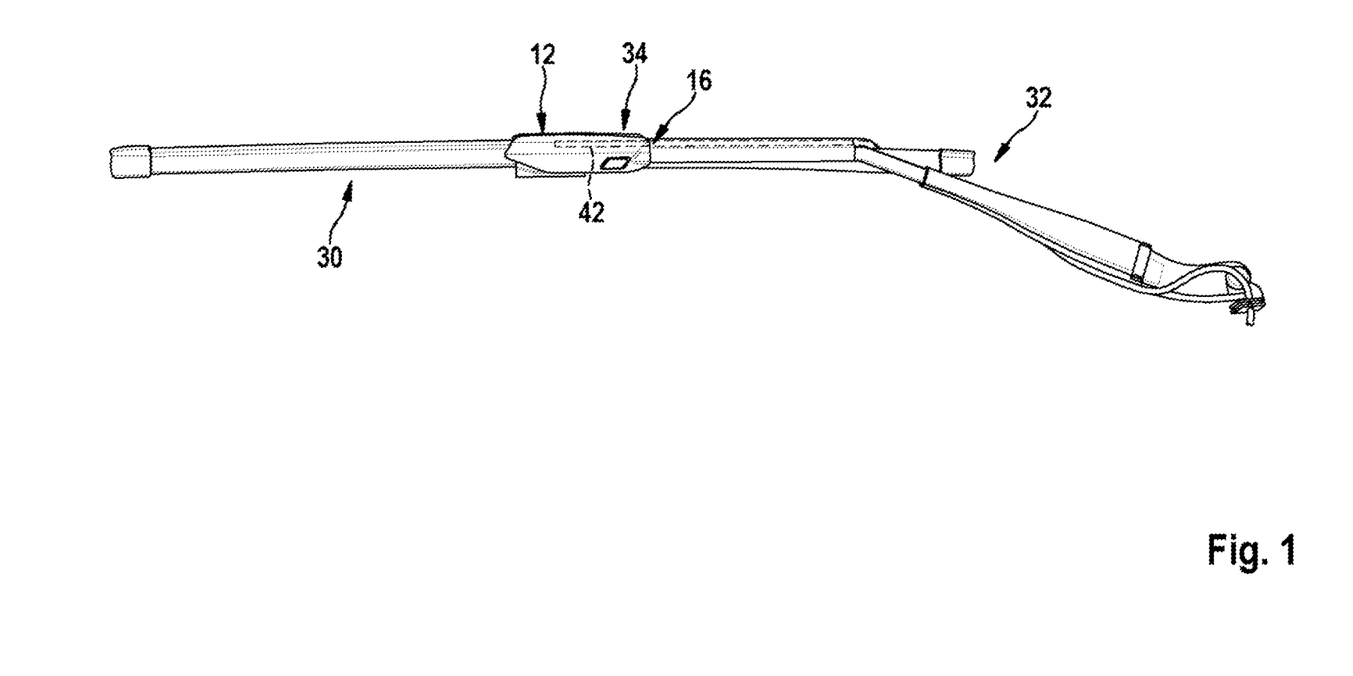
FIG. 1 shows a system having a wiper blade, a wiper arm and a wiper device in a schematic plan view.
Figure 2:
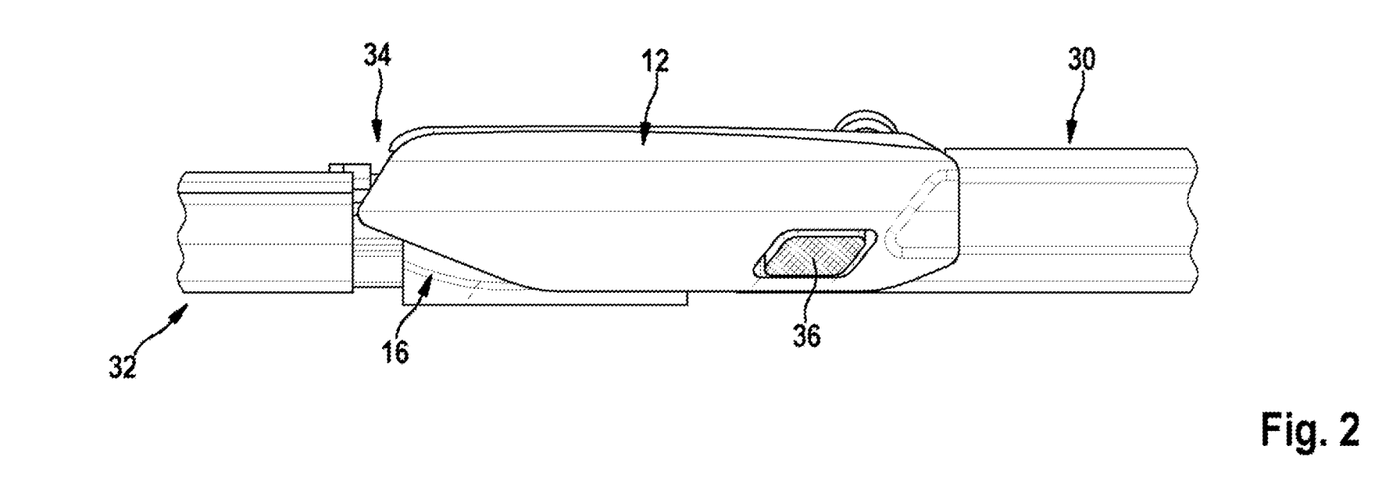
FIG. 2 shows a part of the wiper device with a wiper arm adapter and a wiper blade adapter in a schematic plan view.
Figure 3:
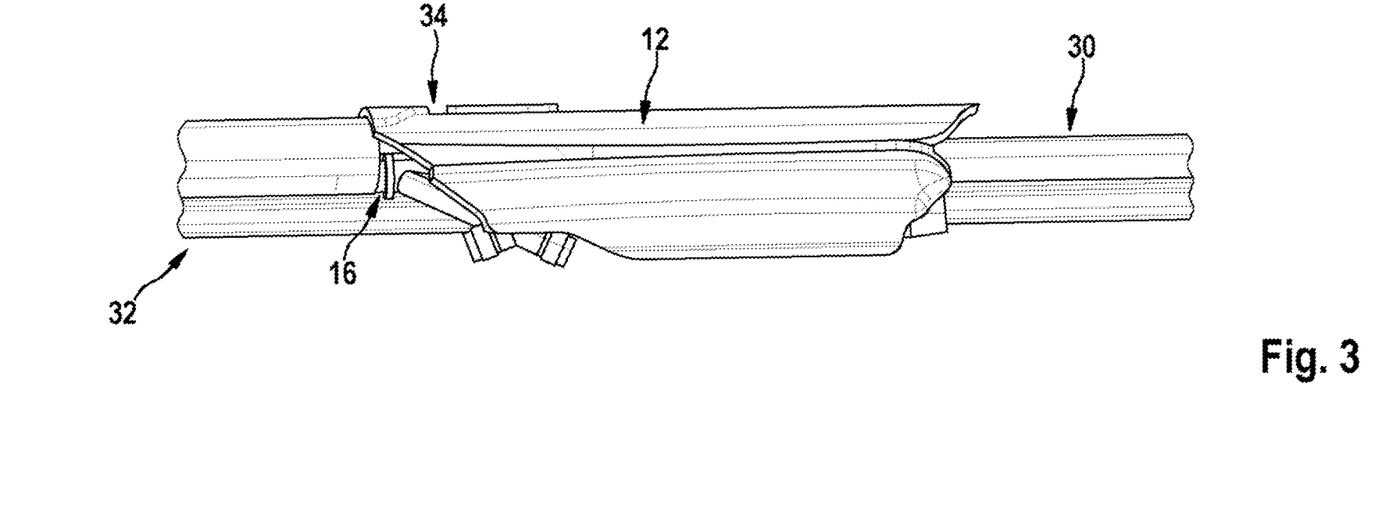
FIG. 3 shows a part of the wiper device with the wiper arm adapter and the wiper blade adapter in a schematic side view.

FIG. 1 shows a system having a wiper blade 30, a wiper arm 32 and having a wiper device. The wiper device in the present case is configured as a windscreen wiper device.

In FIGS. 2 to 5 the wiper device is shown in different views. The wiper device has a wiper blade adapter 12. Moreover, the wiper device has a wiper arm adapter 10. The wiper blade 30 and the wiper arm 32 may be coupled together via the wiper blade adapter 12 and the wiper arm adapter 10. In the present case, for coupling the wiper arm 32 to the wiper blade 30, the wiper arm adapter 10 and the wiper blade adapter 12 may be coupled together in a main extension direction, in particular latched together. The wiper arm adapter 10 and the wiper blade adapter 12 form a side lock adapter. Alternatively or additionally, for coupling the wiper arm to the wiper blade, the wiper arm adapter and the wiper blade adapter could be couplable perpendicular to a main extension direction. The coupling is configured to be releasable. In the present case, the wiper blade adapter 12 comprises at least one actuating element 36, the coupling being releasable thereby.

For the coupling, the wiper blade adapter 12 has at least one guide element 28. When coupled to the wiper arm adapter 10, the guide element 28 is provided at least partially to guide the wiper arm adapter. The wiper arm adapter 10 comprises a corresponding guide element 38. The corresponding guide element 38 is configured so as to correspond to the guide element 28.

Moreover, the wiper device has a spray unit 34. The spray unit 34 is provided for a distribution and/or a discharge of washing water. The spray unit 34 comprises at least one washing water channel 42. The washing water channel 42 is provided for providing washing water.

The washing water channel 42 has at least one wiper blade channel element 16. The wiper blade channel element 16 is arranged on the wiper blade side. The wiper blade channel element 16 is arranged on the wiper blade 30. In the present case, the wiper blade channel element 16 is part of the wiper blade adapter 12. Alternatively, a wiper blade channel element could be configured separately from the wiper blade adapter. In particular, in this case a wiper blade channel element could be couplable separately to a wiper blade.

The wiper blade channel element 16 of the wiper blade adapter 12 has a main extension which is oriented at least substantially parallel to the main extension direction of the wiper blade adapter 12. The guide element 28 of the wiper blade adapter 12 is formed by the wiper blade channel element 16. In the present case, the wiper blade channel element 16 of the wiper blade adapter 12 is formed at least partially integrally on a base body 44 of the wiper blade adapter 12. The base body 44 at least partially covers the wiper blade channel element 16, in particular when viewed in a direction perpendicular to a wiping surface. The wiper blade adapter 12 has at least one spray nozzle element 20. The spray nozzle element 20 is configured at least partially integrally with the wiper blade channel element 16 of the wiper blade adapter 12. The spray nozzle element 20 has at least two nozzle openings. The spray nozzle element 20 is arranged such that the base body 44 at least partially covers the spray nozzle element 20 and namely, in particular, when viewed in a direction perpendicular to a wiping surface. Alternatively, the wiper blade channel element could be connected in a different manner to the base body, such as for example by a positive and/or non-positive connection. Moreover, the wiper blade adapter could have further spray nozzle elements which may be configured, in particular, integrally with the wiper blade channel. Moreover, a spray nozzle could have a number of nozzle openings which differs from the number shown here.

The wiper blade channel element 16 of the wiper blade adapter 12 is at least partially configured as a cylindrical cutout 18. During a coupling process, the part of the wiper blade channel element 16 which is configured as a cutout 18 is provided to guide a wiper arm channel element 14 in the main extension direction of the wiper blade adapter 12. The cutout 18 has a tapering 46. The cutout 18 tapers along the main extension of the wiper blade channel element 16. In the present case, the tapering 46 is configured in a stepwise manner. Alternatively or additionally, the tapering could be configured continuously.

The washing water channel 42 has at least one wiper arm channel element 14. The wiper arm channel element 14 is arranged on the wiper arm side. The wiper arm channel element 14 is arranged on the wiper arm 32. Alternatively, the wiper arm channel element could be configured separately from the wiper arm adapter. In particular, in this case the wiper arm channel element could be couplable separately to the wiper arm.

The wiper arm channel element 14 has a main extension which is oriented at least substantially parallel to the main extension direction of the wiper arm adapter 10. The corresponding guide element 38 of the wiper arm adapter 10 is configured by the wiper arm channel element 14. In the present case, the wiper arm channel element 14 of the wiper arm adapter 10 is formed at least partially integrally on a base body 48 of the wiper arm adapter 10. Alternatively, the wiper arm channel element could be connected in a different manner to the base body of the wiper arm adapter, such as for example by a positive and/or non-positive connection.

The wiper arm channel element 14 comprises at least one spray nozzle element 26. In a coupled state of the wiper arm channel element 14 to the wiper blade channel element 16, the spray nozzle element 26 is arranged outside the wiper blade channel element 16. Moreover, in the coupled state of the wiper blade channel element 16 to the wiper arm channel element 14, the spray nozzle element 28 is at least partially covered by the base body 44 of the wiper blade adapter 12 and namely, in particular, when viewed in a direction perpendicular to a wiping surface.

The wiper arm channel element 14 has a sealing projection 22. The sealing projection 22 is provided to be at least partially wedged and/or to cut into a wall 24 of the wiper blade channel element 16. The sealing projection 22 has at least partially a conical shape. The wiper arm channel element 14 and the wiper blade channel element 16 are connected together in a water-tight manner. The wiper arm channel element 14 is couplable to the wiper blade channel element 16 of the wiper blade adapter 12 in a main extension direction of the wiper blade adapter 12. The wiper arm channel element 14 has at least one stop element 40. The stop element 40 is provided to limit an insertion of the wiper arm channel element 14 into the wiper blade channel element 16 in the main extension direction of the wiper blade adapter 12.

Figure 6:
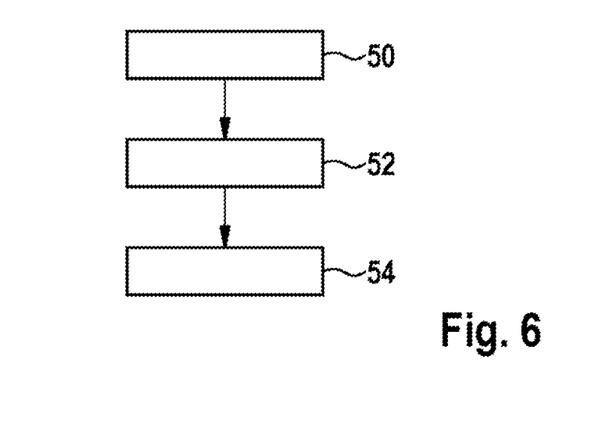

FIG. 6 shows a schematic flow diagram of a method for mounting the wiper device.

Figure 4:
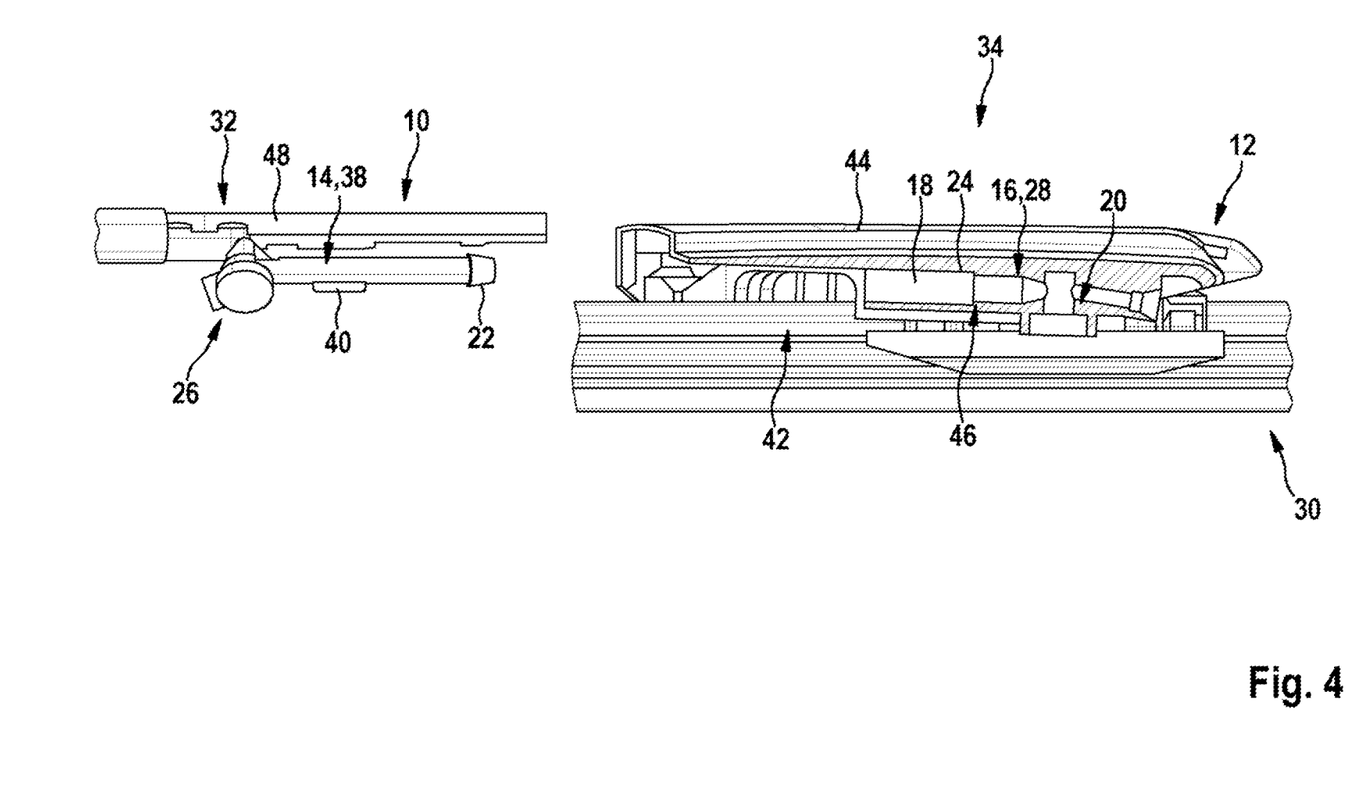
FIG. 4 shows a part of the wiper device with a wiper arm channel element and a wiper blade channel element in a half-sectional view in a state separated from one another.

The method comprises a method step 50. The method step 50 is shown in FIG. 4. In the method step 50 the wiper blade adapter 12 and the wiper arm adapter 10 are oriented parallel to one another. To this end, the main extension direction of the wiper blade adapter 12 is oriented parallel to the main extension direction of the wiper arm adapter 10. Moreover, the wiper blade adapter 12 and the wiper arm adapter 10 are oriented parallel to one another such that the main extension directions coincide with one another.

The method comprises a further method step 52. In the method step 52 for coupling the wiper blade adapter 12 to the wiper arm adapter 10, these components are moved toward one another in a mounting direction. The mounting direction in this case is parallel to the main extension direction of the wiper blade adapter 12 and/or to the main extension direction of the wiper arm adapter 10. To this end, the wiper blade adapter 12 and the wiper arm adapter 10 are moved toward one another, in particular, in a continuous movement in the mounting direction. At the same time, the guide element 28 and the corresponding guide element 38 are inserted into one another. The guide element 28 is formed by the wiper arm channel element 14. The corresponding guide element 38 is formed by the wiper blade channel element 16. The wiper blade adapter 12 and the wiper arm adapter 10 are latched together and namely, in particular, by being clipped into one another.

Figure 5:
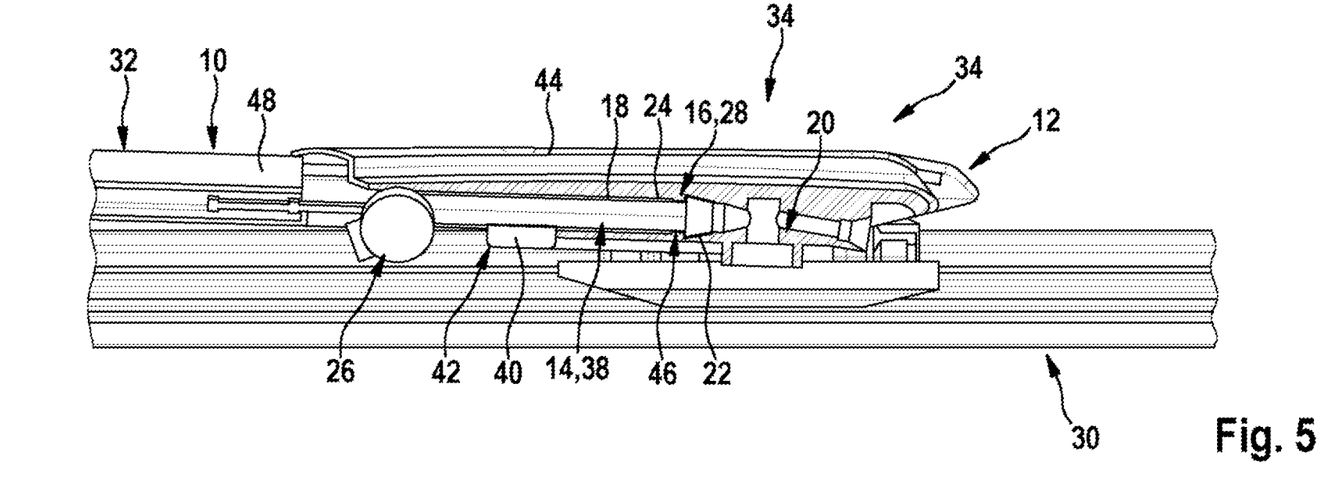
FIG. 5 shows a part of the wiper device with a wiper arm channel element and wiper blade channel element in a half-sectional view in a coupled state and FIG. 6 shows a schematic method sequence of a method for mounting the wiper device.

The method comprises at least one further method step 54. The method step 54 is shown in FIG. 5. The method step 54 takes place at the same time as the method step 52. In the present case, these method steps are described separately from one another merely for the sake of clarity. In the further method step 54 a coupling of the wiper arm channel element 14 to the wiper blade channel element 16 takes place automatically during a coupling of the wiper arm adapter 10 to the wiper blade adapter 12. The wiper arm channel element 14 is coupled to the wiper blade channel element 16 by the wiper arm channel element 14 being inserted at least partially into the wiper blade channel element 16. This preferably takes place at the same time as the insertion of the guide element 28 and the corresponding guide element 38. The sealing projection 22 is guided into the cutout 18 in the main extension direction of the wiper arm adapter 10. The sealing projection 22 is wedged by means of the tapering 46 of the cutout 18. The sealing projection 22 also cuts into the wall 24 of the wiper blade channel.

What is claimed is:

1. A wiper device comprising
    a wiper arm (32) having a wiper arm adapter (10) at a distal end of the wiper arm (32),
    a wiper blade (30) having a wiper blade adapter (12) located between a proximal and distal end of the wiper blade (30), the wiper blade adapter (12) including a base body (44) and a wiper blade channel element (16), wherein the wiper arm adapter (10) is configured for coupling to the wiper blade adapter (12) in a main extension direction of the wiper blade adapter (12), and
    a wiper arm channel element (14) of a spray unit (34), wherein the wiper arm channel element (14) is arranged on the wiper arm (32) and is part of the wiper arm adapter (10), and is configured to extend into the wiper blade channel element (16) of the wiper blade adapter (12) in the main extension direction of the wiper blade adapter (12);
    wherein the wiper blade adapter (12) has at least one spray nozzle element (20) which is configured at least partially integrally with the wiper blade channel element (16).
    wherein the wiper arm channel element (14) has at least one spray nozzle element (26) which is configured to be arranged outside of the wiper blade channel element (16) when the wiper arm channel element (14) has been received within the wiper blade channel element (16).

2. The wiper device as claimed in claim 1, characterized in that the wiper blade channel element (16) has a main extension which is oriented at least substantially parallel to the main extension direction of the wiper blade adapter (12).

3. The wiper device as claimed in claim 1, characterized in that the wiper blade channel element (16) is at least partially integrally formed on a base body (44) of the wiper blade adapter (12).

4. The wiper device as claimed in claim 3, characterized in that the wiper blade channel element (16) is at least partially configured as a cylindrical cutout (18) and is configured to guide the wiper arm channel element (14) for coupling in the main extension direction of the wiper blade adapter (12).

5. The wiper device as claimed in claim 1, characterized in that the wiper arm channel element (14) has a sealing projection (22) which is configured to be at least partially wedged into a wall (24) of the wiper blade channel element (16).

6. The wiper device as claimed in claim 5, characterized in that the sealing projection (22) has at least partially a conical shape.

7. The wiper device as claimed in claim 1, characterized in that the wiper blade adapter (12) has at least one guide element (28) which, when coupled to the wiper arm adapter (10), is configured at least partially to guide the wiper arm adapter (10).

8. A method for mounting a wiper device as claimed in claim 1, in which a wiper arm adapter (10) is coupled to a wiper blade adapter (12) in the main extension direction of the wiper blade adapter (12), characterized in that in at least one method step a wiper arm channel element (14) of a spray unit (34) in the main extension direction of the wiper blade adapter (12) is coupled to a wiper blade channel element (16) of the wiper blade adapter (12).

9. The method as claimed in claim 8, characterized in that in the method step the wiper arm channel element is automatically coupled to the wiper blade channel element when the wiper arm adapter is coupled to the wiper blade adapter.

10. The wiper device as claimed in claim 1, wherein the wiper arm channel element (14) includes a stopper element (40) configured to limit an insertion of the wiper arm channel element (14) into the wiper blade channel element (16).

11. The wiper device as claimed in claim 10, wherein the wiper arm channel element (14) includes a first end and a second, opposite end, wherein the second end includes a sealing projection (22), wherein the spray nozzle element (26) is disposed at the first end, and wherein the stopper element (40) is disposed between the first end and the second end.

12. The wiper device as claimed in claim 11, wherein the wiper blade channel element (16) includes a wall (24), and wherein the sealing projection (22) is configured to be at least partially wedged into the wall (24) of the wiper blade channel element (16).

13. The wiper device as claimed in claim 10, wherein the wiper arm channel element (14) includes a main, elongate body, and wherein the stopper element (40) protrudes laterally away from the main, elongate body.

14. The wiper device as claimed in claim 1, wherein the spray nozzle element (26) is covered completely by the base body (44) of the wiper blade adapter (12) when viewed in the direction perpendicular to the wiping surface.

15. The wiper device as claimed in claim 1, wherein the wiper arm adapter (10) includes a base body (48), and wherein the wiper arm channel element (14) extends parallel to the base body (48).

16. The wiper device as claimed in claim 1, wherein the wiper arm adapter (10) includes a base body (48), and wherein the base body (48) of the wiper arm adapter (10) is configured to slide under the base body (44) of the wiper blade adapter (12).

17. The wiper device as claimed in claim 1, wherein the spray nozzle element (26) is covered at least partially by the base body (44) of the wiper blade adapter (12) when viewed in a direction perpendicular to a wiping surface.

18. The wiper device as claimed in claim 1, wherein the wiper arm adapter (10) is fixed to a portion of the wiper arm (32) and the wiper blade adapter (12) is fixed to a portion of the wiper blade (30), and wherein the wiper arm adapter (10) is configured to be moved along the main extension direction of the wiper blade adapter (12) and latched into the wiper blade adapter (12).

* * * * *